Patented Sept. 18, 1951

2,568,501

UNITED STATES PATENT OFFICE 2,568,501

DIACYL ESTERS OF FLUOROCARBON ALDEHYDROLS

Donald R. Husted, St. Paul, and Arthur H. Ahlbrecht, White Bear Township, Ramsey County, Minn., assignors to Minnesota Mining & Manufacturing Company, St. Paul, Minn., a corporation of Delaware No Drawing. Application September 25, 1950, Serial No. 186,690

10 Claims. (Cl. 260—486)

This application is a continuation-in-part of our copending application Ser. No. 120,008, filed October 6, 1949, which describes and claims the fluorocarbon aldehydes and aldehydrols to which reference is made herein, and which discloses but does not claim the present invention.

The present invention relates to our discovery of a new and useful class of reactive non-cyclic fluorocarbon ester compounds having novel properties.

These new compounds are the non-cyclic diacyl esters of fluorocarbon aldehydrols (aldehyde monohydrates); which are so termed because they may be regarded as derived from the fluorocarbon aldehydrols by replacement of the hydrogen atoms of the two hydroxyl groups thereof by acyl groups (derived from monocarboxylic acids). The esters can actually be made in this manner by reacting the fluorocarbon aldehydrols with carboxylic acid anhydrides in the presence of a basic catalyst of the pyridine type.

These ester compounds can also be conveniently obtained from the fluorocarbon aldehydes by reaction with the anhydrides of monocarboxylic acids in the presence of a trace of sulfuric acid as an acid catalyst. They can also be obtained by reacting the fluorocarbon aldehydrols and acid anhydrides in concentrated sulfuric acid, the latter serving to dehydrate the aldehydrol to the aldehyde which then reacts with the acid anhydride.

These ester compounds can be represented most simply by the generic formula:

or by the equivalent structural formula:

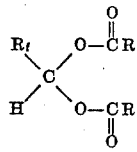

In these formulas "$R_f$" represents a fully fluorinated alkyl group (normal or branched), having the formula: $C_nF_{2n+1}$; and "R" represents an alkyl or alkylene hydrocarbon group (normal or branched), the saturated alkyl group having the formula: $C_nH_{2n+1}$, and the unsaturated alkylene group having the formula: $C_nH_{2n-1}$. The "acyl" group is the terminal "OCR" group.

The esters can also be represented by the formula:

when the acyl group contains an alkyl group; and by the formula:

$$C_nF_{2n+1}CH(OOCC_nH_{2n-1})_2$$

when the acyl group contains an alkylene group.

The parent fluorocarbon aldehydrols (aldehyde monohydrates) have the formula: $R_fCH(OH)_2$, the equivalent structural formula being:

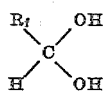

The corresponding fluorocarbon aldehydes have the formula: $R_fCHO$, the equivalent structural formula being:

The aldehyde molecule forms the aldehydrol molecule upon the addition of one molecule of water. These fluorocarbon aldehydes are very sensitive to moisture, forming the corresponding aldehydrols almost instantaneously in the presence of water. Conversely, these aldehydrols can be converted to the corresponding aldehydes by dehydration, using a drying agent such as concentrated sulfuric acid or phosphorous pentoxide, etc.

The lower diacyl esters of fluorocarbon aldehydrols of this invention are clear, colorless, water-insoluble liquids. They are stable and can be distilled without decomposition. When they are subjected to alkaline saponification, three equivalents of base are consumed; the two diacyl groups are saponified and the resulting aldehydrol also reacts and consumes one additional equivalent of base.

These esters have low refractive indices owing to the presence of the terminal fluorocarbon group in the molecule. The distinctive fluorocarbon characteristics of these esters are enhanced when the fluorocarbon group ($R_f$) is a polycarbon chain, which provides the molecule with a fluorocarbon "tail." Various properties can be obtained by varying the number of carbon atoms of the fluorocarbon group ($R_f$) and the number of carbon atoms of the hydrocarbon group (R), and the ratio thereof.

The fluorocarbon and hydrocarbon groups have distinctly different properties. A fluorocarbon chain is very stable and inert and is both hydrophobic and oleophobic, whereas a hydrocarbon chain is hydrophobic but oleophylic. This is of importance in respect to the surface-active properties of these esters, and their use as blending and plasticizing agents. They can be employed as emulsifying agents in the preparation of emulsions of fluorocarbons with hydrocarbons, and the like, due to the presence of fluorocarbon and hydrocarbon "tails" which render each of the ester molecules partly soluble and partly insoluble in each phase, and causes them to concentrate at the interfaces.

These esters (particularly those which contain three or more carbon atoms in the fluorocarbon group, which equal or exceed in number the number of carbon atoms in each hydrocarbon group) have utility as plasticizers for fluorinated resins and polymers.

The diacrylate esters of this invention are homopolymerizable and are copolymerizable with other polymerizable monomers. They also have utility as cross-linking agents for modifying or curing other polymers. (A "cross-linking agent" in polymer chemistry is a polyfunctional compound which can be used in small proportion to cure (harden or stiffen) a linear polymer as the result of linking together the polymer chains at various points to form a three-dimensional network.) For instance, the n-heptafluorobutyraldehydrol diacrylate ester, $$C_3F_7CH(OOCCH:CH_2)_2$$

can be included in small proportion for this purpose in the polymerization recipe for the emulsion polymerization of 1,1-dihydroheptafluorobutyl acrylate; thereby changing the resultant polymer from one that is soft to one that is firm, or resinous and hard (depending on the proportion of the cross-linking agent). A high fluorine content is maintained because of the fluorine content of this curing agent.

The following table sets forth comparative data on boiling points, refractive indices, and densities, for several illustrative compounds of this invention, all of which are clear, colorless, water-insoluble, stable liquids. The last compound is illustrative of the diacrylate esters, having alkylene hydrocarbon groups. In these particular compounds both the fluorocarbon and hydrocarbon chains are "normal" (i. e. straight non-branched chains).

| Formula | B. P. (° C.) | $n_D^{20}$ | $d_4^{20}$ |
| --- | --- | --- | --- |
| | Mm. | | |
| $CF_3CH(OOCCH_3)_2$ | 149/743 | 1.354 | 1.291 |
| $C_2F_5CH(OOCCH_3)_2$ | 157/743 | 1.346 | 1.361 |
| $C_3F_7CH(OOCCH_3)_2$ | 164/743 | 1.338 | 1.431 |
| $C_7F_{15}CH(OOCCH_3)_2$ | [1] 222/750 | 1.333 | 1.673 |
| $C_3F_7CH(OOCC_3H_7)_2$ | 113/24 | 1.363 | 1.269 |
| $C_3F_7CH(OOCCH:CH_2)_2$ | 70/14 | 1.361 | 1.400 |

[1] Micro.

It will be understood that the higher members of the fluorocarbon aldehydrol and aldehyde series and the higher members of the monocarboxylic acid and acid anhydride series can be employed in making these esters. The ester-forming reactions are general and are not limited to compounds containing a few carbon atoms. The esters of chief practical interest are those in which the "$R_f$" and "R" groups each contain from one to twelve carbon atoms.

As previously mentioned, the diacyl esters of this invention can be readily prepared by the direct reaction of the fluorocarbon aldehyde and the anhydride of the monocarboxylic acid, in the presence of a trace of concentrated sulfuric acid serving as a catalyst. This reaction is shown by the following equation:

$$R_fCHO + O(OCR)_2 \xrightarrow{H_2SO_4} R_fCH(OOCR)_2$$

A specific illustration is the formation of the diacetate ester of trifluoroacetaldehydrol from trifluoroacetaldehyde and acetic anhydride:

$$CF_3CHO + O(OCCH_3)_2 \xrightarrow{H_2SO_4} CF_3CH(OOCCH_3)_2$$

A further illustration is the formation of the diacrylate ester of n-heptafluorobutyraldehydrol from n-heptafluorobutyraldehyde and acrylic anhydride:

$$n\text{-}C_3F_7CHO + O(OCCH:CH_2)_2 \xrightarrow{H_2SO_4}$$
$$n\text{-}C_3F_7CH(OOCCH:CH_2)_2$$

A suitable preparatory procedure for this method is exemplified by the following example:

EXAMPLE 1

To a dry 100 ml. 2-necked flask, equipped with a reflux condenser and a dropping funnel, there were added 7 grams (0.035 mol) of n-heptafluorobutyraldehyde and 7 grams (0.055 mol) of acrylic anhydride. The mixture was then cooled with an ice-salt bath and 3 drops of concentrated sulfuric acid were slowly added (a considerable amount of heat being evolved). After the evolution of heat had ceased, the flask was stoppered and placed in a refrigerator over night at 10° C. The liquid was then poured into a separatory funnel and washed in turn with water, 10% sodium bicarbonate solution, and water, and was then dried over anhydrous calcium sulfate ("Drierite") for 24 hours. The product was decanted from the calcium sulfate and distilled through a small Vigreux column under reduced pressure (10–15 mm.). Preliminarily, a gram of cupric acetate had been added to the pot as a polymerization inhibitor.

The product had a boiling range of 66–72° C. at 14 mm. pressure, a refractive index at 20° C. of 1.361, and a density (grams/cc. at 20° C.) of 1.400. It was identified as the relatively pure diacrylate ester of n-heptafluorobutyraldehydrol, having the formula:

$$n\text{-}C_3F_7CH(OOCCH:CH_2)_2$$

Another method of making the present ester compounds, previously mentioned, is to react the fluorocarbon aldehydrol with the anhydride of the monocarboxylic acid, in the presence of pyridine. This reaction is shown by the following equation:

$$R_fCH(OH)_2 + 2O(OCR)_2 \xrightarrow{\text{Pyridine}}$$
$$R_fCH(OOCR)_2 + 2RCOOH$$

A specific illustration is the formation of the diacetate ester of n-heptafluorobutyraldehydrol by reacting the fluorocarbon aldehydrol and acetic anhydride, the other reaction product being acetic acid:

$$n\text{-}C_3F_7CH(OH)_2 + 2O(OCCH_3) \xrightarrow{\text{Pyridine}}$$
$$n\text{-}C_3F_7CH(OOCCH_3)_2 + 2CH_3COOH$$

This is exemplified by the following example:

EXAMPLE 2

To provide the n-heptafluorobutyraldehydrol starting compound, use was made of the distilled reduction mixture of boiling range 85–95° C. obtained from the lithium aluminum hydride reduction of n-heptafluorobutyric acid, the preparation of which is described hereafter under the heading "Preparation of the Fluorocarbon Aldehydes and Aldehydrols." This mixture also contains the by-product compound 1,1-dihydroheptafluorobutyl alcohol, having the formula n-$C_3F_7CH_2OH$, which has a boiling point of 95° C., whereas the aldehydrol compound has a boiling point of 93° C., both taken at 740 mm. The mixture can be used for present purposes, which is convenient as these two compounds cannot be easily separated by distillation owing to the closeness of their boiling points. (However, if desired, the aldehyde can be easily recovered from the mixture, as hereinafter described, and then converted with water to the aldehydrol which, in pure form, can be employed in the present procedure for making the ester).

To a dry 100 ml. flask equipped with a reflux condenser there were added 25 grams of the above mentioned mixture, 25 grams of acetic anhydride and 10 ml. of pyridine. This mixture was refluxed overnight, and upon cooling was transferred to a separatory funnel and washed in turn with water, 10% sodium bicarbonate solution, and water, and was then dried over anhydrous calcium sulfate for 24 hours. The product was decanted from the calcium sulfate and was distilled through an efficient semi-micro column of 8-10 theoretical plates. The acetate of the 1,1-dihydroheptafluorobutyl alcohol was separated by distillation at 105° C. (743 mm.) and the desired diacetate ester of the aldehydrol was collected by distillation at 164° C. (743 mm.). It had a refractive index at 20° C. of 1.338 and a density (grams/cc. at 20° C.) of 1.431, and was identified as the relatively pure diacetate ester of n-heptafluorobutyraldehydrol.

*Preparation of the fluorocarbon aldehydes and aldehydrols*

The previously mentioned fluorocarbon aldehydrols, having the formula $R_fCH(OH)_2$, can be made by reduction of the corresponding fluorocarbon carboxylic acids, having the formula $R_fCOOH$, using lithium aluminum hydride ($LiAlH_4$) as the reduction agent. The aldehydrol compound can be converted by dehydration to the corresponding aldehyde, having the formula $R_fCHO$, by using a drying agent such as sulfuric acid, phosphorous pentoxide, etc.

The following example illustrates the method as applied to the making of n-heptafluorobutyraldehydrol, n-$C_3F_7CH(OH)_2$, and n-heptafluorobutyraldehyde, n-$C_3F_7CHO$, by reduction of n-heptafluorobutyric acid, n-$C_3F_7COOH$, viz.:

The reaction apparatus is a dry 3000 ml. 3-necked glass flask equipped with a stirrer, a water-cooled reflux condenser, a dropping funnel, and a gas inlet tube so that dry nitrogen can be flowed through the system. The apparatus should be dried at 120° C. before use and assembled while still hot with dry oxygen-free nitrogen passing through the apparatus.

Precautions must be observed in using the $LiAlH_4$ reduction agent. It is sensitive to $H_2O$ and $CO_2$ in the air, is spontaneously inflammable with water, and inflames on rubbing unprotected in a mortar. The material is crushed in a mortar under a dry nitrogen atmosphere and added rapidly to the ether in the flask with a slow nitrogen stream flowing through the system. In case of a fire, do not use a water or carbon dioxide fire extinguisher. Use nitrogen or sodium chloride powder.

With nitrogen flowing through the system, the flask is charged with 1250 ml. of dry diethyl ether and then with 19 grams (0.5 mol) of powdered $LiAlH_4$. The suspension is stirred until the $LiAlH_4$ dissolves, leaving only a slight haze of insoluble impurities in suspension. To this solution is added dropwise 107 grams (0.5 mol) of n-$C_3F_7COOH$ in 1000 ml. of dry diethyl ether while the flask is kept cool in an ice bath. The addition is made at a rate which will produce a gentle reflux of the ether.

Upon completion of the addition the nitrogen is turned off and the reaction mixture is stirred for 48 hours. Then the nitrogen is turned on, the flask is cooled with an ice-salt mixture, and sufficient water is added dropwise to decompose the excess $LiAlH_4$. Hydrogen is evolved as long as the latter is present. The endpoint is not sharp, but about 10 ml. water should be sufficient, and 2 to 5 ml. excess water should be added to be sure all unreacted $LiAlH_4$ is destroyed. A modified procedure is to make the first small addition of water by means of diethyl ether saturated with water, and use a 2 cubic ft. per hour sweep stream of nitrogen saturated with water vapor. To avoid explosions, great care should be exercised to maintain a nitrogen atmosphere in the reaction flask.

After the addition of water is completed, add immediately an ice-cold solution of 80 ml. (1.5 mols) of concentrated sulfuric acid in 200 ml. of water, with continued cooling. Separate the two layers and extract the bottom water layer three times with diethyl ether. The upper ether layer and the ether extracts from the bottom layer are combined and the ether removed in a stripping still. A still with 4 to 6 theoretical plates is sufficient.

The residue is dried over anhydrous calcium sulfate ("Drierite") and distilled through an efficient semi-micro fractionating column, which should have 6 to 15 theoretical plates. The cut boiling from 85 to 95° C., which should weigh 85-95 grams, contains the fluorocarbon aldehydrol product. (This is the starting mixture used in "Example 2").

The aldehyde can be prepared by charging the abovementioned 85-95° cut into a 2-neck 200 ml. flask equipped with a dropping funnel and a dry semi-micro fractionating column. Care should be taken that all joints are tight. 35 ml. of concentrated sulfuric acid is added slowly through the dropping funnel and the resulting mixture is refluxed gently to cause decomposition of the aldehydrol compound, which is the precursor of the aldehyde. The mixture is gently refluxed as too much heat may cause a sudden evolution of aldehyde. The aldehyde product distils out at a temperature of 28-30° C. It is collected in a receiver cooled by solid-$CO_2$, whose outlet is protected by a trap cooled by solid-$CO_2$ and a drying tube. The yield is about 40%.

The fluorocarbon aldehyde product is kept dry and cold (below 0° C.) for storage.

The fluorocarbon monocarboxylic acids, having the formula $R_fCOOH$, employed in the just-described procedure for making the fluorocarbon aldehydrols and aldehydes, can be made by hydrolyzing the corresponding acid fluorides, having the formula $R_fCOF$. The acid fluorides can be made by electrolyzing a solution of anhydrous liquid hydrogen fluoride containing a dissolved hydrocarbon monocarboxylic acid (or its anhydride) of corresponding carbon skeletal structure, by passing direct current through the solution at a cell voltage which is insufficient to generate molecular (free elemental) fluorine under the existing conditions, but which is sufficient to cause the formation of the fully fluorinated acid fluoride at a useful rate.

Excellent results can be obtained with simple single compartment electrolytic cell arrangements. No diaphragm is needed between electrodes. The cell can be readily operated at atmospheric pressure, employing a cell temperature in the neighborhood of 0° C. The cell and the cathodes can be made of iron or steel, and the anodes of nickel, and such cells have been satisfactorily operated at approximately 5 to 6 volts, D. C. The fluorocarbon acid fluoride product of the cell operation is relatively insoluble in the electrolyte solution and either settles to the bottom of the cell from which it can be drained with other fluorocarbon products of the process, or is volatilized and evolves from the cell in admixture with the hydrogen and other gaseous products. The fluorocarbon acid fluoride compound can be hydrolyzed to the fluorocarbon acid derivative ($R_fCOOH$) while still mixed with other products and the acid product can be separated and recovered. Another procedure is to react the acid fluoride with ammonia to produce the amide ($R_fCONH_2$), a solid compound which can be readily separated and purified, and then hydrolyze the latter to produce the fluorocarbon acid ($R_fCOOH$).

This electrochemical process is described and broadly claimed in the patent of J. H. Simons, No. 2,519,983, granted on August 22, 1950. Fluorocarbon acids are described and claimed in the copending application of A. H. Diesslin, E. A. Kauck and J. H. Simons, Ser. No. 70,154, filed January 10, 1949, which also describes the electrochemical process.

What we claim is as follows:

1. As new compositions of matter, the reactive non-cyclic diacyl esters of the fluorocarbon aldehydrols, having the generic formula:

$$R_fCH(OOCR)_2$$

where "$R_f$" is a fully fluorinated alkyl group containing one to twelve carbon atoms, and "R" is a hydrocarbon group of the class consisting of alkyl and alkylene groups containing one to twelve carbon atoms.

2. The diacyl alkyl esters of fluorocarbon aldehydrols having the formula:

$$C_nF_{2n+1}CH(OOCC_nH_{2n+1})_2$$

where $n$ in each instance has an integer value of one to twelve.

3. The diacyl alkylene esters of fluorocarbon aldehydrols having the formula:

$$C_nF_{2n+1}CH(OOCC_nH_{2n-1})_2$$

where $n$ in each instance has an integer value of one to twelve.

4. The diacetate esters of fluorocarbon aldehydrols having the formula:

$$C_nF_{2n+1}CH(OOCCH_3)_2$$

where $n$ has an integer value of one to twelve.

5. The diacetate ester of trifluoroacetaldehydrol having the formula:

$$CF_3CH(OOCCH_3)_2$$

6. The diacetate ester of pentafluoropropionaldehydrol having the formula:

$$C_2F_5CH(OOCCH_3)_2$$

7. The diacetate ester of heptafluorobutyraldehydrol having the formula:

$$C_3F_7CH(OOCCH_3)_2$$

8. The dibutyrate ester of heptafluorobutyraldehydrol having the formula:

$$C_3F_7CH(OOCC_3H_7)_2$$

9. The diacrylate esters of fluorocarbon aldehydrols having the formula:

$$C_nF_{2n+1}CH(OOCCH:CH_2)_2$$

where $n$ has an integer value of one to twelve.

10. The diacrylate ester of heptafluorobutyraldehydrol having the formula:

$$C_3F_7CH(OOCCH:CH_2)_2$$

DONALD R. HUSTED.
ARTHUR H. AHLBRECHT.

No references cited.